US007648169B2

(12) United States Patent
Kobayashi

(10) Patent No.: US 7,648,169 B2
(45) Date of Patent: Jan. 19, 2010

(54) MOTORCYCLE

(75) Inventor: Kenji Kobayashi, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 340 days.

(21) Appl. No.: 11/855,833

(22) Filed: Sep. 14, 2007

(65) Prior Publication Data

US 2008/0093146 A1     Apr. 24, 2008

(30) Foreign Application Priority Data

Sep. 15, 2006    (JP)   ............................. 2006-250518

(51) Int. Cl.
*B62J 27/00* (2006.01)
(52) U.S. Cl. .................. 280/784; 280/202; 180/219
(58) Field of Classification Search ............... 180/311, 180/271, 219, 65.31; 280/756, 304.3, 784, 280/202
See application file for complete search history.

(56) References Cited

U.S. PATENT DOCUMENTS 3,544,158 A  *   12/1970   Timms ...................... 297/254
3,743,321 A  *   7/1973   Luschen et al. ............. 280/202

FOREIGN PATENT DOCUMENTS

JP          08-198158        8/1996

\* cited by examiner

*Primary Examiner*—Lesley Morris
*Assistant Examiner*—Levon Fiore
(74) *Attorney, Agent, or Firm*—Keating & Bennett, LLP

(57) ABSTRACT

A motorcycle includes a guard frame provided near an upper portion of a vehicle body of the motorcycle that is arranged to reduce or prevent damage to the components of the motorcycle in the event of an overturn of the motorcycle. The guard frame includes a pair of guard frame rails, each rail extending in a longitudinal direction of the vehicle body. A connecting portion connects the rear end portions of the rails. The front end portion of each rail is fixed to a body frame of the motorcycle. The connecting portion is supported by the body frame for pivotal movement about a pivot axis. The rails have a normal bow shape that projects outwardly. In some arrangements, an intermediate portion of each rail is formed of a material having lower rigidity than a material of the front and rear end portions of the rail.

20 Claims, 8 Drawing Sheets

MOTORCYCLE

RELATED APPLICATIONS

This application is related to, and claims priority from, Japanese Patent Application No. 2006-250518, filed Sep. 15, 2006, the entirety of which is incorporated by reference herein and made a part of the present specification.

BACKGROUND OF THE INVENTION

1. Field of the Invention

The present invention relates to a motorcycle with a guard frame that inhibits or prevents damage to outward-facing components of a vehicle body of the motorcycle in the event an overturn of the motorcycle.

2. Description of the Related Art

As disclosed in Japanese Publication No. 08-198158, for example, a motorcycle is provided with protectors for preventing damage to an outermost part of a vehicle body in the event of an overturn of the motorcycle. The protector of the motorcycle disclosed in Japanese Publication No. 08-198158 is attached to an outermost part of a body frame in a vehicle width direction to project toward the lateral side. In an overturn of the vehicle body, the protector will contact a road surface to support the vehicle body, thereby preventing damage to the other parts of the vehicle body due to their contacting the road surface. The protector can be formed of iron-based materials, aluminum alloys or synthetic resin-based materials.

Both lateral sides of the body frame with the protectors extend in the longitudinal direction of the vehicle body on both lateral sides of a cylinder head of an engine, and are connected to both lateral sides of the cylinder head. That is, both lateral sides of the body frame are connected to one another via the engine.

In such a motorcycle, the protector will contact the road surface to support the vehicle body in an overturn of the motorcycle. The reaction force applied to the protector from the road surface will be transmitted from the ground side to the opposite side of the body frame via the cylinder head. Thus, this motorcycle can receive the above reaction force from the road surface on both lateral sides of the body frame.

SUMMARY OF THE INVENTION

In a structure such as the motorcycle disclosed in Japanese Publication No. 08-198158, the protector is securely connected to the body frame, and the cylinder head is securely connected to the body frame. An aspect of the present invention involves the realization by the present inventors that, when the motorcycle overturns, any shock applied to the protector will be transmitted from the body frame to the cylinder head. In such a motorcycle, therefore, the body frame or the cylinder head may undergo shock in the event of an overturn, possibly resulting in damage to those parts.

In view of these issues with the prior art arrangements, one or more preferred embodiments of the present invention provide a motorcycle in which any overturn shock is reduced, thereby reliably reducing or preventing damage to certain components of the motorcycle in the event of an overturn of the motorcycle.

An aspect of a preferred embodiment of the present invention provides a motorcycle including a guard frame at an upper part of a vehicle body. The guard frame includes a left and right guard frame rail, each rail extending in a longitudinal direction of the vehicle body. A connecting portion connects first end portions of the guard frame rails such that the guard frame assumes a generally U-shaped configuration, as seen in a plan view, in which an open end of the U-shape is aligned with a longitudinal direction of the vehicle body. A second end portion of each guard frame rail is secured to a body frame of the motorcycle. The connecting portion is supported in a generally central lateral location by the body frame for pivotal movement about a generally vertical pivot axis. Each guard frame rail has a normally bow-shaped configuration that projects outwardly in a lateral direction. An intermediate portion of each guard frame rail is constructed of a material having lower rigidity than a material of the first and second end portions thereof.

Another aspect of a preferred embodiment of the present invention provides a motorcycle as described above, in which the intermediate portion of each guard frame rail is formed of an elastic member composed of a non-metallic material.

Yet another aspect of a preferred embodiment of the present invention provides a motorcycle as described above, in which the intermediate portion of each guard frame rail and a vehicle component on the inside of the intermediate portion in the lateral direction define a space therebetween which allows a user to grip the guard frame rail by hand.

With a motorcycle constructed as described above, when the vehicle body has overturned, the intermediate portion of one of the frame rails will contact the road surface in the event that the motorcycle is overturned. The guard frame rail on the ground side will resiliently deform from a bow shape to a straighter shape while pushing the connecting portion of the guard frame by contacting the road surface. At this time, since the connecting part is pushed by the guard frame rail on the ground side, it will pivot about the pivot axis to thereby push the other guard frame rail. As the other guard frame rail is pushed at one end connected to the connecting portion, it will be compressed longitudinally, so that it will resiliently deform to project further outwardly of the vehicle body at its intermediate portion (i.e., to become more bowed).

Thus, the intermediate portions of the guard frame rails resiliently deform individually in an overturn of the motorcycle. As a result, any overturn shock to the motorcycle is reduced by the intermediate portions. Therefore, any damage to the parts in the event of an overturn of the motorcycle is reliably reduced or prevented.

Because, in some arrangements, the intermediate portions are constructed of a non-metallic material, no rust will form on any damaged part of the intermediate portions of the guard frame rails due to their contacting the road surface, and thus the external appearance of the motorcycle does not deteriorate.

Furthermore, in certain arrangements, because the user can grip the intermediate portions of the guard frame rails by hand, it is possible to use the guard frame rails as a grab bar or a lift handle for placing the motorcycle on its stand.

In some arrangements, because the intermediate portion of each guard frame rail is formed of an electrical insulating material, such as synthetic resin or hard rubber, if the vehicle body is electrostatically charged, any electrostatic discharge through the user's hand gripping the intermediate section is prevented.

BRIEF DESCRIPTION OF THE DRAWINGS

These and other features, aspects and advantages of the present invention are described below with reference to drawings of preferred embodiments, which are intended to illustrate, but not to limit, the present invention. The drawings contain eight (8) figures.

DETAILED DESCRIPTION OF THE PREFERRED EMBODIMENTS

Figure 1:
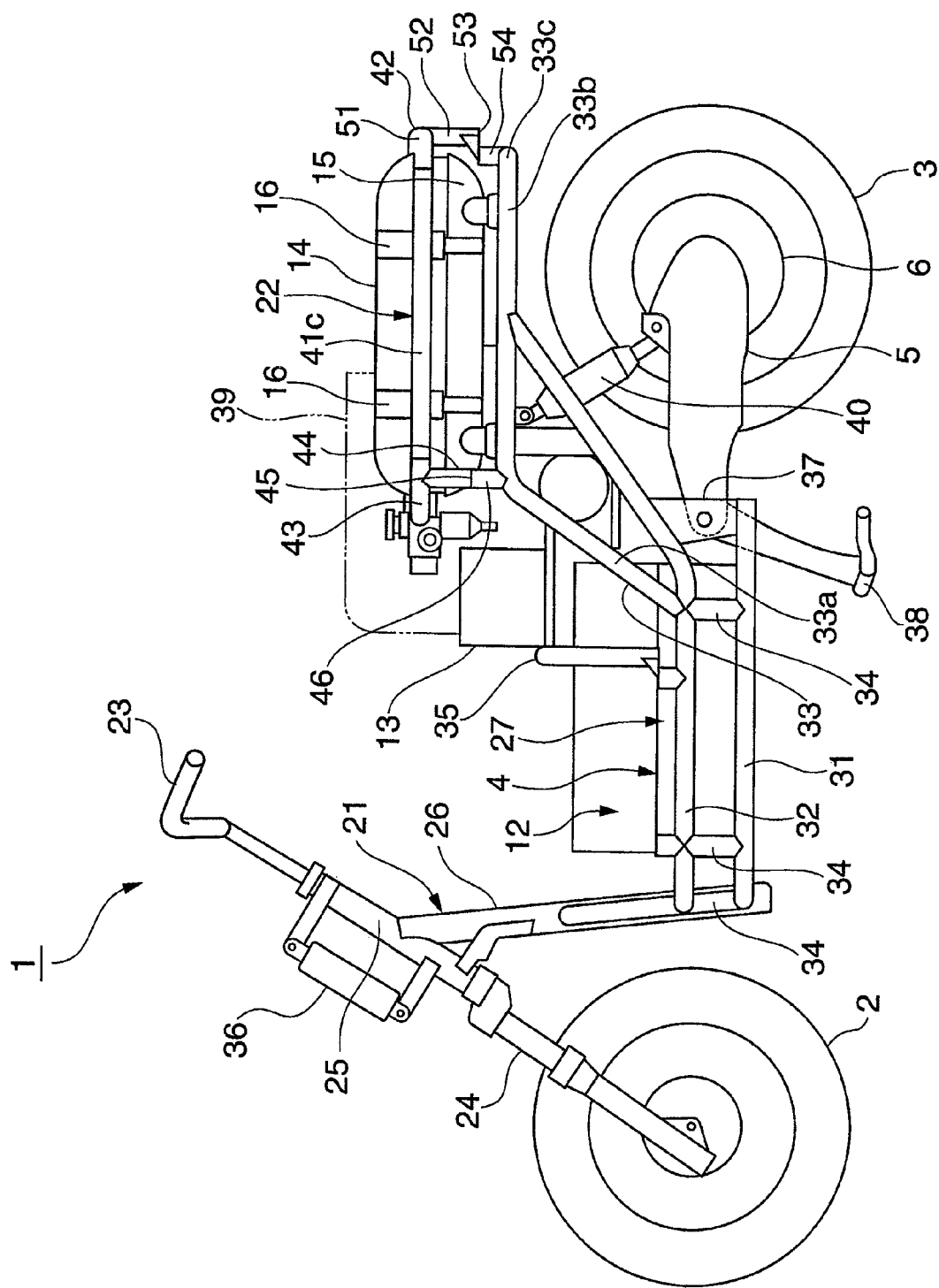
FIG. 1 is a side elevation view of a motorcycle having certain features, aspects and advantages of one or more preferred embodiments of the present invention.
Figure 2:
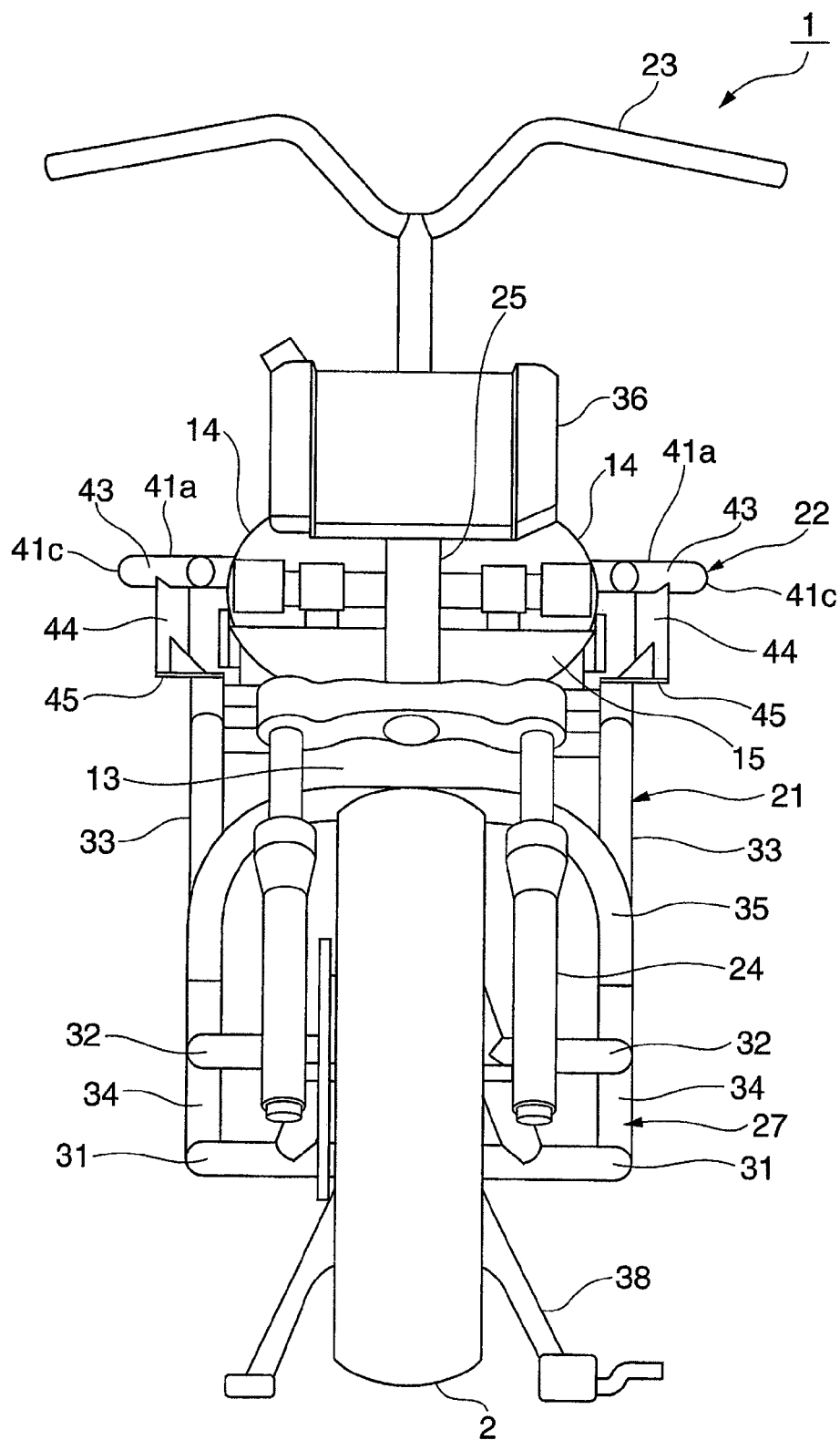
FIG. 2 is a front elevation view of the motorcycle of FIG. 1.
Figure 3:
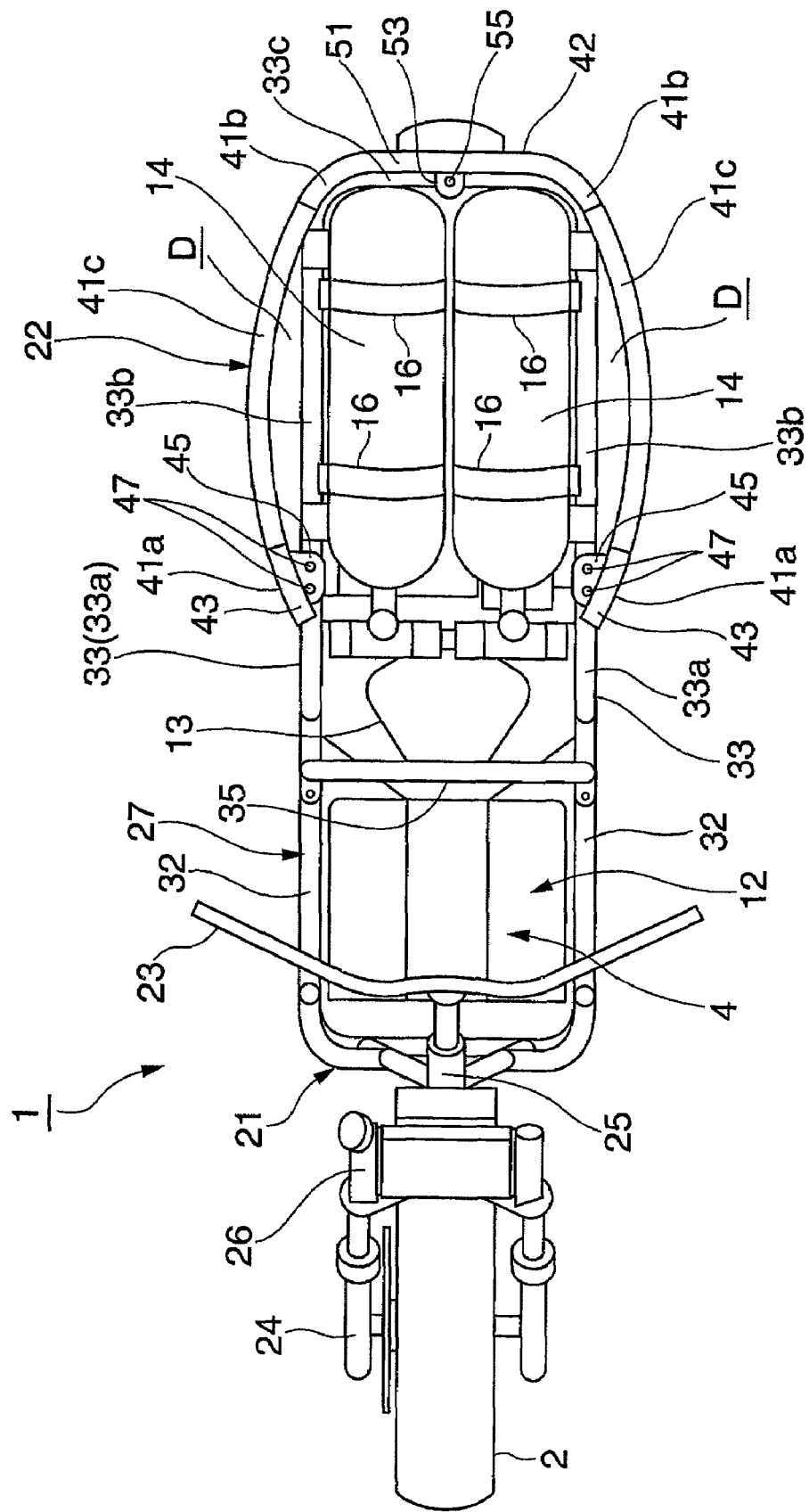
FIG. 3 is a plan view of the motorcycle FIG. 1.
Figure 4:
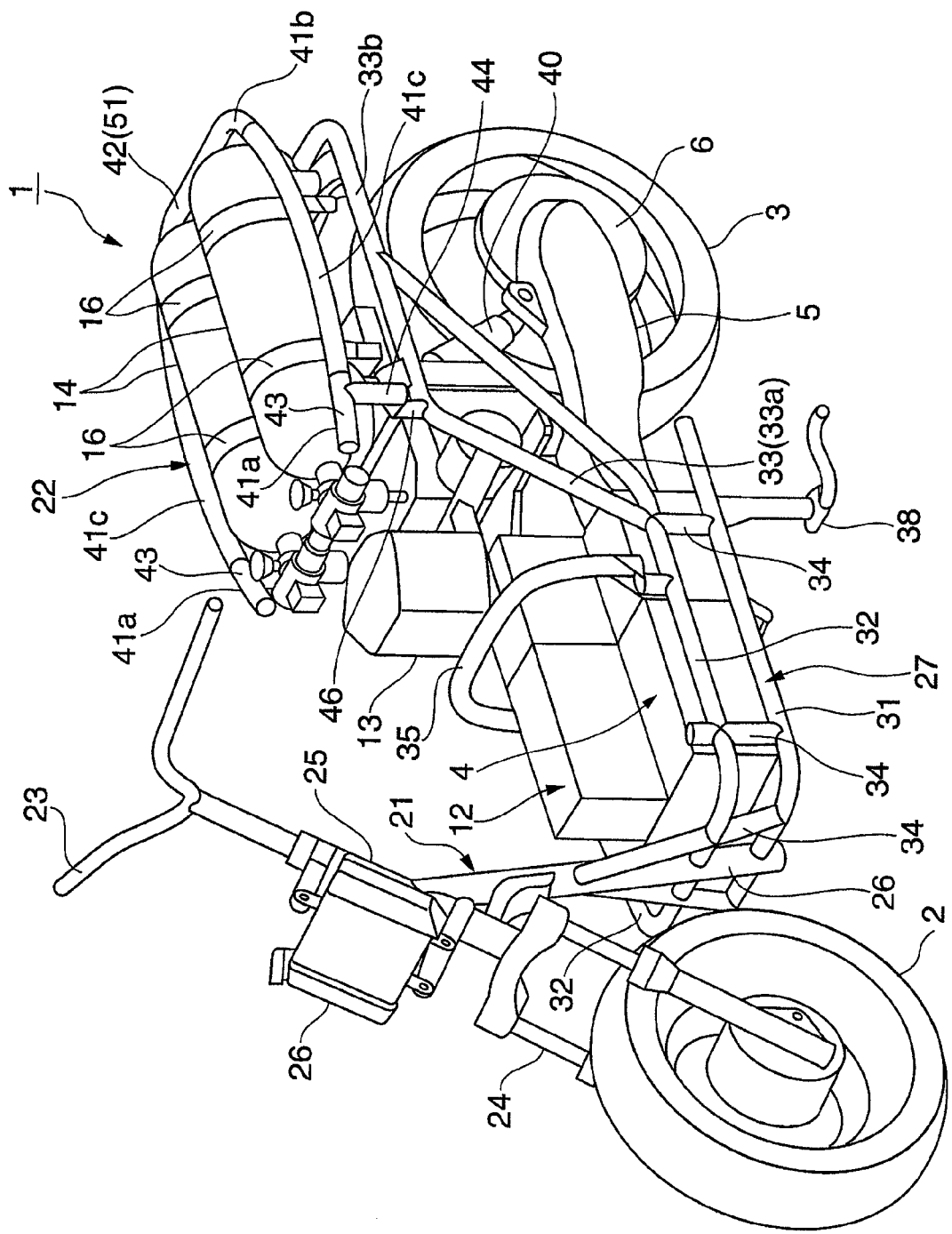
FIG. 4 is a perspective view of the motorcycle FIG. 1.
Figure 5:
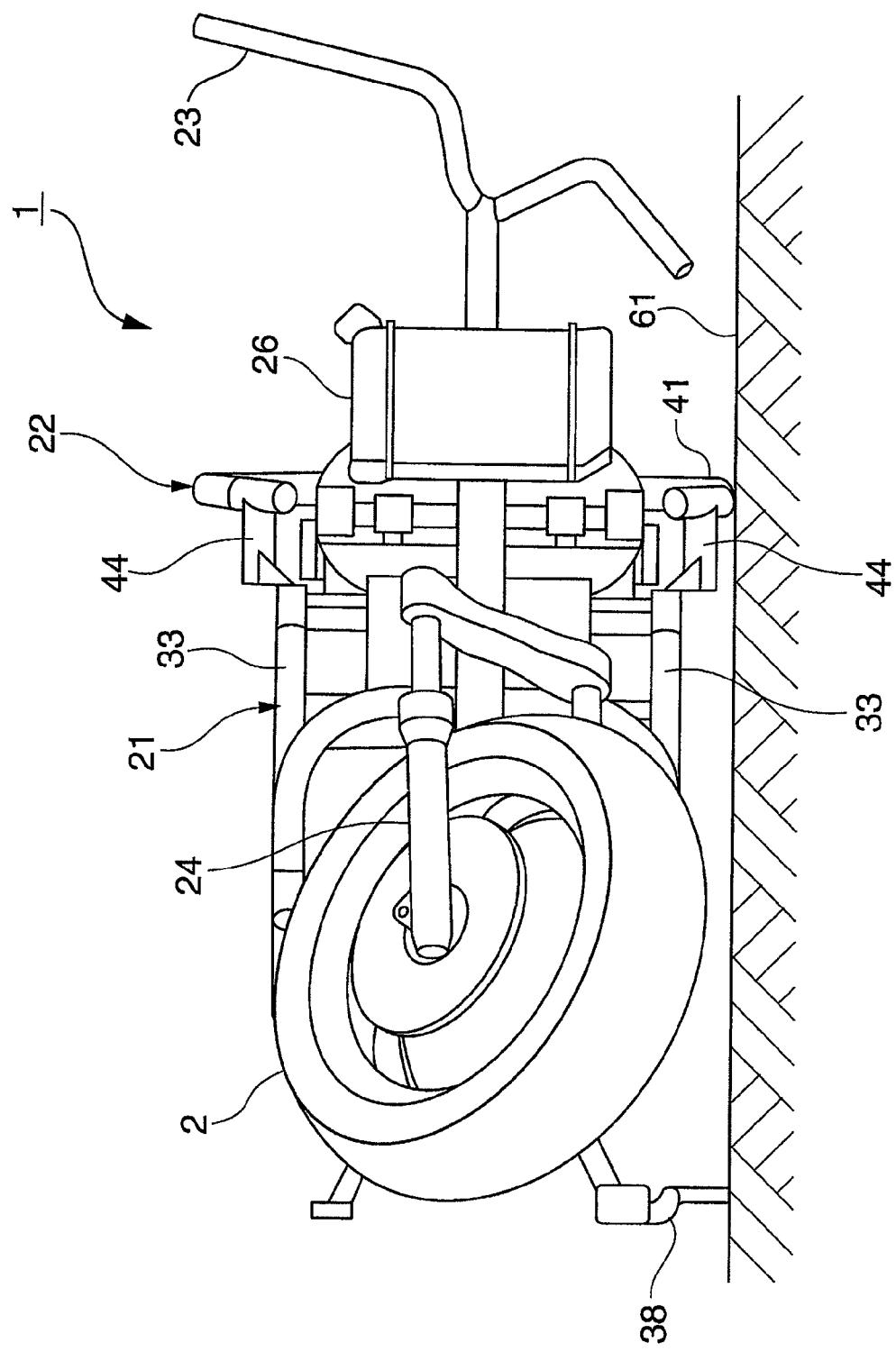
FIG. 5 is a front elevation view of the motorcycle of FIG. 1, with the motorcycle in an overturned state laying on its side on a surface.

A motorcycle having certain features, aspects and advantages of preferred embodiments of the present invention is described in detail with reference to FIGS. 1 to 8. FIG. 1 is a side elevation view of a motorcycle. FIG. 2 is a front elevation view of the motorcycle of FIG. 1. FIG. 3 is a plan view of the motorcycle of FIG. 1. FIG. 4 is a perspective view of the motorcycle of FIG. 1. FIG. 5 is a front elevation view of the motorcycle of FIG. 1 illustrating the motorcycle in an overturned state.

Figure 6:
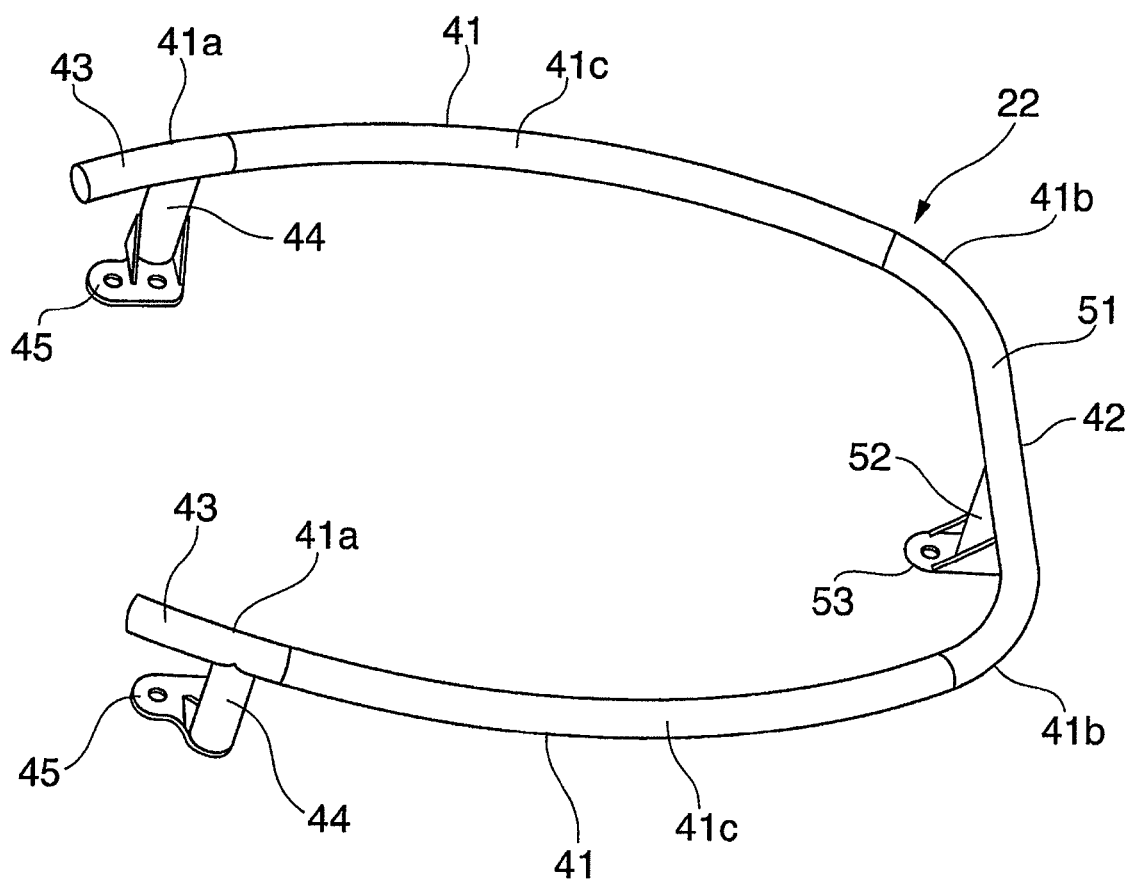
FIG. 6 is a perspective view of a guard frame assembly of the motorcycle of FIG. 1.
Figure 7:
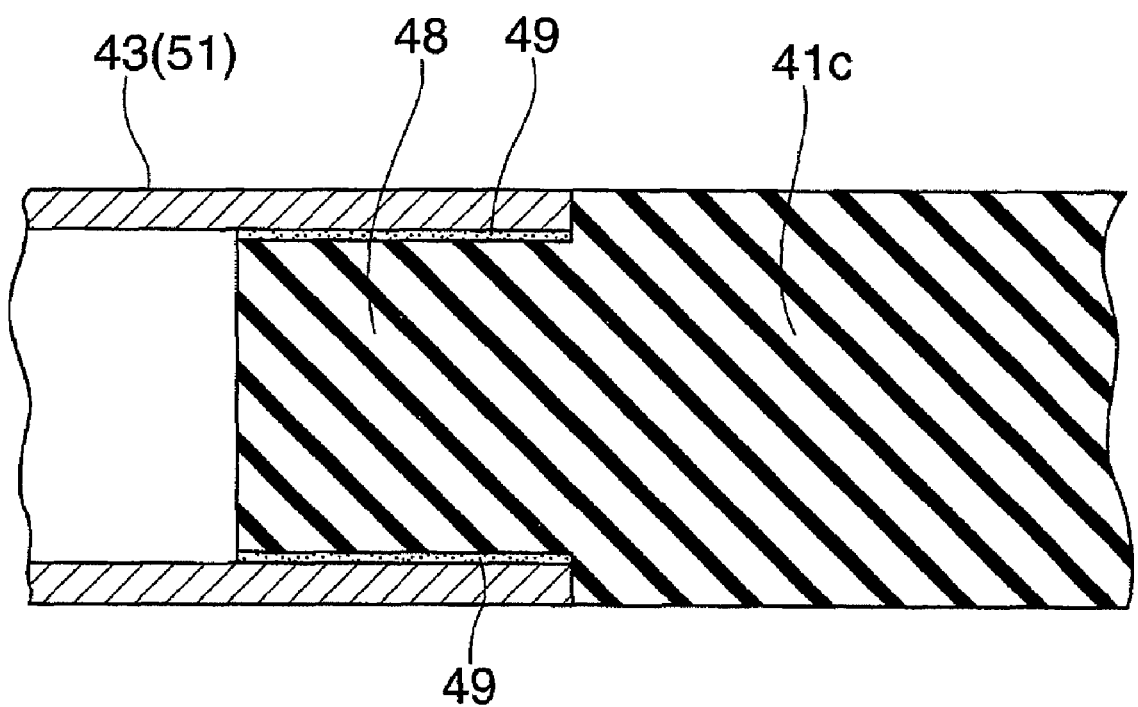
FIG. 7 is an enlarged cross-sectional view of a junction between an intermediate portion and an end portion of a lateral frame member.
Figure 8:
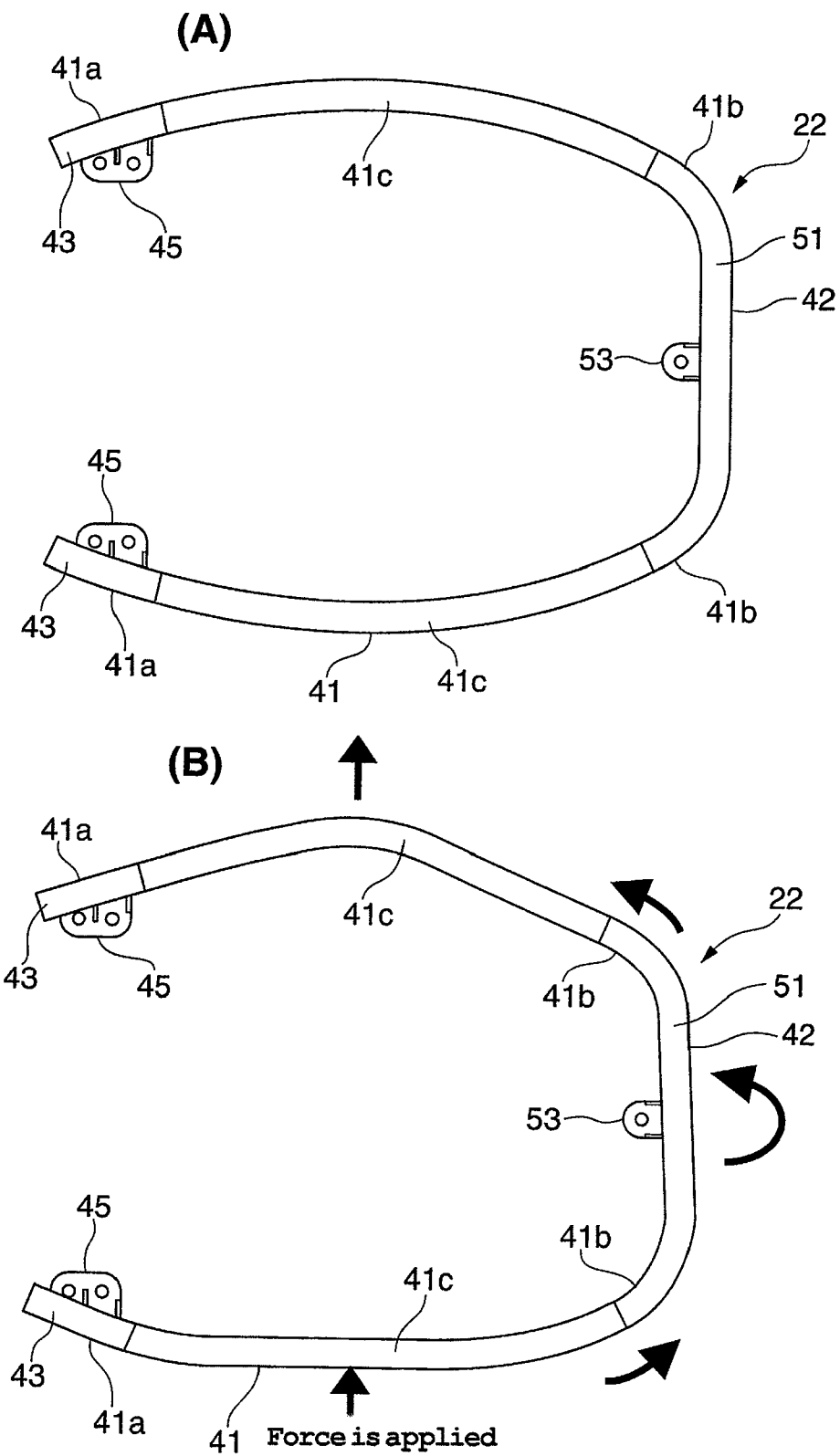
FIGS. 8A and 8B are plan views that illustrate the manner in which the guard frame assembly resiliently deforms in the event that the motorcycle is overturned.

FIG. 6 is a perspective view of a guard frame assembly of the motorcycle of FIG. 1. FIG. 7 is an enlarged cross-sectional view of a junction between an intermediate portion and an end portion of a lateral frame member. FIGS. 8A and 8B are plan views illustrating a manner in which the guard frame assembly resiliently deforms, in which FIG. 8A illustrates the state before the motorcycle overturns and FIG. 8B illustrates the state when the motorcycle has overturned.

In the drawings, reference numeral 1 generally indicates a motorcycle having certain features, aspects and advantages of one or more embodiments of the present invention. The motorcycle 1 is of type commonly referred to as a scooter, and has a low-height footrest 4 between a front wheel 2 and a rear wheel 3. The area above the footrest 4 is a generally open space providing the motorcycle 1 with a "step-through" body. The motorcycle 1 is propelled by a motor 6 provided in a rear swingarm assembly 5. The motor 6 is drivingly coupled to the rear wheel such that an output torque of the motor 6 rotates the rear wheel 3. It is contemplated that features, aspects and advantages of the present invention can be applied to common types of motorcycles (not shown) with an engine for driving the rear wheel, as well as electric two-wheeled vehicles using the motor 6 as a drive source, as shown. In addition, vehicles have more than two wheels may also utilize certain features, aspects and advantages of the present invention, especially those vehicles that are somewhat unstable and susceptible to overturning despite the presence of more than two wheels.

The motor 6 is provided at the rear end of the rear swingarm 5 and rotates an axle (not shown) of the rear wheel 3. A fuel cell unit 12 and a battery 13 charged by the fuel cell unit 12 are used as a power source for the motor 6. The fuel cell unit 12 is installed on the footrest 4, and has fuel cells included therein. The fuel cell unit 12 can generate electricity using a fuel (e.g., hydrogen) and an oxidant (e.g., oxygen). The hydrogen can be supplied from a fuel storage unit, which in the illustrated arrangement is in the form of one or more, and preferably two, hydrogen cylinders 14 provided at a rear part of a vehicle body. The oxygen can be supplied by the ambient atmosphere.

The two hydrogen cylinders 14, 14 are each placed on a tank holder 15 at the rear part of the vehicle body to be arranged side by side in a vehicle width direction while directing in a longitudinal direction of the vehicle body. Each hydrogen cylinder 14 is tightly bound and fixed to the tank holder 15 with bands 16. To protect the hydrogen cylinders 14, the motorcycle 1 incorporates a guard frame assembly, or guard frame 22, attached to a rear portion of a body frame 21 of the motorcycle 1, which is described below.

As shown in FIGS. 1 to 4, the body frame 21 of the motorcycle 1 includes a head tube 25 for supporting a steering handlebar 23 and a front fork 24 for steering movement. A down tube 26 extends in a downward direction from the head pipe 25. A main frame 27 is made up of a plurality of pipes or tubes welded to a lower part of the down tube 26.

The illustrated main frame 27 is made up of a pair of left and right lower frame members or tubes 31, a pair of left and right intermediate tubes 32, an upper tube 33, a plurality of reinforcement tubes 34, a cross member 35 and the like. The lower tubes 31 are welded to the lower end of the down tube 26. The intermediate tubes 32 are welded to the down tube 26 in a position above the lower tubes 31. The upper tubes 33 is welded to intermediate portions of the intermediate tubes 32 and extend in an upward direction from the intermediate tubes 32. In alternative arrangements, the main frame 27 may be constructed in an alternative manner, such as by different numbers or orientations of the frame members, or by frame members that are joined by methods other than welding. In some arrangements, the main frame 27 could be a unitary structure.

A radiator 36 is attached to the head pipe 25. Coolant for cooling the fuel cell unit 12 flows through the radiator 36.

As shown in FIG. 3, on the front side of the vehicle body, the lower tubes 31 and the intermediate tubes 32 extend in a rearward direction and pass by both lateral sides of the footrest 4. The intermediate tube 32 is curved near the rear end of the footrest 4 and extends obliquely in an upward and rearward direction.

This inclined portion of the intermediate tube 32 supports the rear arm 5 via a rear arm bracket 37 for vertical pivotal movement. A main stand 38 is pivotally attached to the rear swingarm 5. In FIGS. 1, 2, 4 and 5, the main stand 38 is shown in a standing position, in which the main stand 38 is capable of supporting the motorcycle 1 in an upright position.

The illustrated upper tube 33 includes a pair of left and right front portions 33a and 33a, a pair of left and right rear portions 33b and 33b, and a lateral portion 33c. The paired left and right front portions 33a and 33a extend obliquely upward and rearward from the respective intermediate tubes 32 near the front portions of the curved portion of the intermediate tubes 32. The paired left and right rear portions 33b and 33b extend generally horizontally in the longitudinal direction of the vehicle body above the rear wheel 3, as illustrated in the side view (FIG. 1). The lateral portion 33c connects the rear ends of the rear portions 33b, 33b.

As seen in the plan view (FIG. 3), the upper tube 33 is generally a U-shaped member in which the open end of the "U" faces forward relative to a normal direction of travel of the motorcycle 1. In addition, as shown in FIG. 3, the width of the upper tube 33 in the vehicle width direction is the same, or about the same, as the width between the paired left and right intermediate tubes 32.

In a position above the front portion of the upper tube 33, a straddle-type seat 39 for a rider (not shown) is provided. A rear cushion unit, or shock absorber 40, is disposed between the left rear portion 33b of the upper tube 33 and the rear swingarm 5. The above-described tank holder 15 is attached to the rear portion 33b of the upper tube 33. The rear portion 33b is welded (or otherwise secured) at a longitudinal intermediate location to the rear end of the middle tube 32 such that it is supported by the middle tube 32 from below.

As shown in FIGS. 3 and 6, the illustrated guard frame 22 includes at least one left and at least one right guard frame member portions or rail portions ("rails") 41 that are oriented in a generally horizontal manner and extend generally in the longitudinal direction of the vehicle body. A connecting portion 42 connects the rear ends of the rails 41. As seen in the plan view (FIG. 8A), the guard frame 22 assumes a generally U-shaped configuration, with the open end of the "U" facing forward and the center portions of the rails 41 bulged outward. The rails 41 may be of any suitable construction to perform the desired functions, such as those described herein. The rails 41 may be elongate members formed from a variety of materials or combinations of materials and may be of a solid cross-section or hollow cross-section. Furthermore, various cross-sectional shapes of the rails 41 may be employed.

Each rail 41 has a front end portion 41a and a rear end portion 41b. In the illustrated arrangement, both the front end portion 41a and rear end portion 41b are made of metal. A longitudinal intermediate portion 41c between the front and rear end portions 41a and 41b of the rail 41 is formed of a material having lower rigidity than that of the front and rear end portions 41a and 41b. In some arrangements, the intermediate portions 41c are constructed, at least in part, of a non-metallic material. The illustrated intermediate portions 41c are formed of a hard rubber material or a rubber-like material such that the intermediate portions 41c are resilient or elastic.

The illustrated intermediate portion 41c is constructed of a solid bar formed of hard rubber into a certain shape. As shown in FIGS. 3 and 8(A), the intermediate portion 41c of the rail 41 has an arcuate shape projecting to the outside in the vehicle width direction, as seen in the plan view. The intermediate portion 41c is formed into an arcuate shape as described above such that the intermediate portion 41c and the hydrogen cylinder 14 define a space D (see FIG. 3) therebetween, which allows a user to grip the intermediate portion 41c by hand. Also, the intermediate portion 41c is positioned in an outermost point in the vehicle width direction in the rear portion 33b of the vehicle body when the guard frame 22 is attached to the body frame 21.

As shown in FIG. 6, the front end 41a of the rail 41 is formed by a frame member or tube 43 bonded to the intermediate portion 41c to extend forward and generally horizontal therefrom. A vertical frame member or tube 44 extends downward from the horizontal tube 43 and is welded (or otherwise secured) to the horizontal tube 43. The vertical tube 44 has a lower end to which an attachment plate 45 is welded (or otherwise secured). As shown in FIGS. 1 and 4, the attachment plate 45 is attached to a supporting boss 46 projecting from the rear portion 33b of the upper tube 33 with attachment bolts 47 (FIG. 3).

The length of the vertical tube 44 is set such that, as shown in FIG. 1, the intermediate portion 41c is positioned to face a generally central portion in the vertical direction of the hydrogen cylinder 14 (the portion that projects out the most) when the attachment plate 45 is attached to the supporting boss 46. As shown in FIG. 7, a junction (connection or bonding portion) between the horizontal tube 43 and the intermediate portion 41c is structured such that a small-diameter portion 48 of the intermediate portion 41c is fitted in the horizontal tube 43 and bonded thereto with an adhesive 49.

As shown in FIG. 6, the connecting portion 42 includes at least one generally horizontal tube 51 that extends in the vehicle width direction. A vertical support tube 52 is welded (or otherwise secured) to generally the center of the horizontal tube 51 in the vehicle width direction and extends downward. An attachment plate 53 is welded (or otherwise secured) to the lower end of the vertical tube 52. The rear end portions 41b of the rails 41 are formed by both end portions of the horizontal tube 51 of the connecting part 42. More specifically, both end portions of the horizontal tube 51 are angled to project forward and are bonded to the intermediate portion 41c on the left of the vehicle body and to the intermediate portion 41c on the right of the vehicle body, respectively.

These bonding portions are structured in the same manner as the bonding portion between the front end portion 41a and the intermediate portion 41c (see FIG. 7). The vertical tube 52 of the connecting part 42 has a length such that the intermediate portions 41c are positioned generally horizontally.

As shown in FIG. 1, the attachment plate 53 of the connecting portion 42 is attached to a support member 54 projecting from the lateral portion 33c of the upper tube 33 with a connecting bolt 55 (see FIG. 3) for pivotal movement about a vertical axis defined by a shaft portion of the bolt 55. The support member 54 is positioned at the center of the lateral portion 33c in the vehicle width direction and pivotally supports the connecting portion 42.

Since the front ends 41a of the paired left and right rails 41 and the connecting portion 42 are attached individually to the upper tube 33, the guard frame 22 in the illustrated arrangement is provided at an upper portion of the vehicle body and in a position where the guard frame 22 surrounds both lateral sides and the rear side of the hydrogen cylinders 14.

With an arrangement substantially as described above, if the motorcycle 1 overturns to the left when using the main stand 38 for example, the left rail 41 of the guard frame 22 will contact a road surface 61, as shown in FIG. 5. In this situation, the motorcycle 1 will be supported on the guard frame 22 and the main stand 38. In addition, the steering handlebar 23 may contact the road surface 61, but preferably would do so without supporting any portion, or very little, of the vehicle weight.

If the vehicle body has overturned in this way, the guard frame 22 will deform from a normal state shown in FIG. 8(A) to a damping state shown in FIG. 8(B). That is, the intermediate portion 41c of the left rail 41 will resiliently deform to extend longitudinally as it is pushed against the road surface. In other words, the intermediate portion 41c will resiliently deform from a bow shape to a straighter shape, while pushing the left end of the connecting part 42 rearward.

As a result of being pushed by the rail 41 on the left of the vehicle body (on the ground side) in this way, the connecting part 42 will tilt in a manner pivoting in the counterclockwise direction about the connecting bolt 55, as seen in the plan view (FIG. 8B), thereby pushing the rear end 41b of the right rail 41 forward. As a result of being pushed forward at the rear end 41b by the connecting part 42, the right rail 41 will be compressed longitudinally, so that it will resiliently deform to project further outwardly of the vehicle body at the intermediate portion 41c having an arcuate shape as seen in the plan view (FIG. 8B).

Thus, in the illustrated motorcycle 1, the intermediate portions 41c of the two rails 41 resiliently deform individually in the event that the motorcycle 1 is overturned to transfer energy from one rail 41 to the opposing rail 41. As a result, any overturn shock to the motorcycle 1 is significantly reduced by the intermediate portions 41c. Therefore, in the above-described embodiments, the present invention enables manufacture of the motorcycle 1 in which damage to the hydrogen cylinders 14 in an overturn of the motorcycle is reliably reduced or prevented.

In the illustrated arrangement, the intermediate portions 41c of the guard frame 22 are formed of hard rubber, or a similar rubber-like material. As a result, no rust will form on any damaged part of the intermediate portions 41 due to their contacting the road surface, and thus there is no deterioration of the external appearance of the motorcycle 1. Thus, preferably at least the outer surfaces of the intermediate portions 41c are rubber, rubber-like or a non-metallic material.

Furthermore, in the illustrated arrangement, the intermediate portion 41c of the guard frame 22 and the hydrogen cylinder 14 define the space D therebetween which allows the user to grip the intermediate portion 41c by hand. As a result, the user can grip the intermediate portion 41c by hand. Thus, it is possible to use the rail 41 as a grab bar or a handle when lifting the motorcycle 1 onto the stand 38.

The intermediate portion 41c is formed of hard rubber, or an electrical insulating material. As a result, in the event the vehicle body becomes electrostatically charged, any electrostatic discharge through the user's hand gripping the intermediate portion 41c is prevented. Additionally, in the event of an electric leakage in the power supply system of the motor 6, in the electric motorcycle 1 for example, the user is prevented from getting an electric shock when gripping the intermediate portion 41c.

In the foregoing arrangement, the intermediate portion 41c of the guard frame 22 is formed of hard rubber. It is understood, however, that any suitable material can be used as the material of the intermediate portion 41c having lower rigidity than that of the components of the vehicle body, such as the body frame 21, and which resiliently deforms to push the connecting part 42 in an overturn of the motorcycle. For example, it is considered that the intermediate portion 41c can be formed using synthetic resin as a non-metallic material besides hard rubber or formed of a metallic spring material. It is also understood that the intermediate portion 41c may not be in the solid bar-shape having a circular cross section shown in the foregoing embodiment, but can be modified to any suitable shape.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present motorcycle has been described in the context of particularly preferred embodiments, the skilled artisan will appreciate, in view of the present disclosure, that certain advantages, features and aspects of the motorcycle may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A motorcycle, comprising:
a vehicle body comprising a body frame;
a guard frame located on an upper portion of the vehicle body of the motorcycle, the guard frame comprising:
a left guard frame rail;
a right guard frame rail, each of the left and right guard frame rails extending in a longitudinal direction of the vehicle body; and
a connecting portion that connects first ends of the left and right guard frame rails such that the guard frame defines a generally U-shape structure, wherein an open end of the U-shape structure is aligned with a longitudinal direction of the vehicle body;
wherein a second end portion of each of the left and right guard frame rails is secured to the body frame, the connecting portion is supported by the body frame for pivotal movement about a substantially vertical pivot axis located substantially at a lateral center of the vehicle body, wherein each of the left and right guard frame rails normally assumes a bow shape that projects outwardly, and an intermediate portion of each of the left and right guard frame rails is formed of a material having a lower rigidity than a material of the first and second ends of the left and right guard frame rails.

2. The motorcycle of claim 1, wherein the intermediate portion of each of the left and right guard frame rails is formed of an elastic member constructed from a non-metallic material.

3. The motorcycle of claim 2, wherein the intermediate portion of each of the left and right guard frame rails and a vehicle component inward of the intermediate portion of each of the left and right guard frame rails define a space therebetween which allows a user to grip the intermediate portion of the left and right guard frame rails by hand.

4. The motorcycle of claim 1, wherein the intermediate portion of each of the left and right guard frame rails and a vehicle component inward of the intermediate portion of each of the left and right guard frame rails define a space therebetween which allows a user to grip the intermediate portion of the left and right guard frame rails by hand.

5. The motorcycle of claim 1, wherein the open end of the U-shaped structure faces a forward direction of the motorcycle.

6. The motorcycle of claim 1, wherein the guard frame surrounds a fuel storage unit of the motorcycle.

7. The motorcycle of claim 6, wherein the fuel storage unit comprises at least one hydrogen cylinder.

8. The motorcycle of claim 1, wherein one of the left and right guard frame rails elastically deforms such that a distance between the first end portion and the second end portion of the one guard frame rail increases when the one guard frame rail contacts a surface in an overturned condition of the motorcycle, the lengthening of the one guard frame rail moves the connecting portion about the pivot axis, which causes elastic deformation of the other of the left and right guard frame rails such that a distance between the first end portion and the second end portion of the other guard frame rail decreases.

9. The motorcycle of claim 1, wherein the guard frame is positioned over a rear wheel of the motorcycle.

10. A motorcycle, comprising:
a vehicle body comprising a body frame;
a guard frame secured to the body frame, the guard frame comprising:
a first guard frame rail;
a second guard frame rail, the first and second guard frame rails extending along opposing sides of the vehicle body, the first and second guard frame rails having resilient intermediate portions; and a connecting portion that connects first end portions of the first and second guard frame rails;

wherein a second end portion of each of the first and second guard frame rails is secured to the body frame, the connecting portion is supported by the body frame for pivotal movement about a pivot axis that is generally perpendicular to a direction in which the first and second guard frame rails extend such that deformation of the first frame rail applies a force to the connecting portion that rotates the connecting portion about the pivot axis to cause deformation of the second frame rail.

11. The motorcycle of claim 10, wherein the intermediate portion of each of the first and second guard frame rails is constructed from a non-metallic material.

12. The motorcycle of claim 11, wherein the intermediate portion of each of the first and second guard frame rails and a vehicle component inward of the intermediate portion of each of the first and second guard frame rails define a space therebetween which allows a user to grip the intermediate portion of the first and second guard frame rails by hand.

13. The motorcycle of claim 10, wherein the intermediate portion of each of the first and second guard frame rails and a vehicle component inward of the intermediate portion of each of the first and second guard frame rails define a space therebetween which allows a user to grip the intermediate portion of the first and second guard frame rails by hand.

14. The motorcycle of claim 10, wherein the first guard frame rail, second guard frame rail and connecting portion form a generally U-shaped structure in which an open end of the U-shaped structure faces a forward direction of the motorcycle.

15. The motorcycle of claim 10, wherein the guard frame surrounds a fuel storage unit of the motorcycle.

16. The motorcycle of claim 15, wherein the fuel storage unit comprises one or more hydrogen cylinders.

17. The motorcycle of claim 10, wherein both the first and second guard frame rails have an arcuate shape and may be deformed from the arcuate shape by an application of force.

18. The motorcycle of claim 17, wherein one of the first and second guard frame rails elastically deforms such that the one guard frame rail becomes less arcuate in shape when the one guard frame rail contacts a surface in an overturned condition of the motorcycle, and the other of the first and second guard frame rails deforms such that the other guard frame rail becomes more arcuate in shape.

19. The motorcycle of claim 10, wherein the guard frame is positioned over a rear wheel of the motorcycle.

20. The motorcycle of claim 10, wherein the motorcycle is a scooter.

* * * * *